(12) United States Patent
Street et al.

(10) Patent No.: US 8,368,697 B2
(45) Date of Patent: Feb. 5, 2013

(54) PROVIDING AN OVERVIEW OF A LARGE EVENT SAMPLE PERIOD THAT SUPPORTS TRIAGE AND NAVIGATION

(75) Inventors: Nigel Street, Swindon (GB); Andrew McDermott, Swindon (GB); Christopher Cherrington, Swindon (GB)

(73) Assignee: Wind River Systems, Inc., Alameda, CA (US)

( * ) Notice: Subject to any disclaimer, the term of this patent is extended or adjusted under 35 U.S.C. 154(b) by 1929 days.

(21) Appl. No.: 10/188,298

(22) Filed: Jul. 2, 2002

(65) Prior Publication Data

US 2004/0004617 A1    Jan. 8, 2004

(51) Int. Cl.
*G06T 11/20* (2006.01)
(52) U.S. Cl. .............. 345/440; 345/659; 345/440.1
(58) Field of Classification Search ............. 345/440, 345/440.1, 440.2, 441, 442, 447
See application file for complete search history.

(56) References Cited

U.S. PATENT DOCUMENTS

| | | | | |
|---|---|---|---|---|
| 4,975,636 A * | 12/1990 | Desautels | ............... | 324/121 R |
| 5,631,825 A * | 5/1997 | van Weele et al. | ............... | 700/83 |
| 5,860,067 A * | 1/1999 | Onda et al. | ............... | 705/9 |
| 5,872,909 A * | 2/1999 | Wilner et al. | ............... | 714/38 |
| 6,229,536 B1 * | 5/2001 | Alexander et al. | ......... | 345/440.1 |
| 6,559,868 B2 * | 5/2003 | Alexander et al. | ............ | 345/781 |
| 6,704,012 B1 * | 3/2004 | Lefave | ............ | 345/440 |
| 2003/0140282 A1 * | 7/2003 | Kaler et al. | ............ | 714/39 |

* cited by examiner

*Primary Examiner* — Michelle L Sams
(74) *Attorney, Agent, or Firm* — Davidson, Davidson & Kappel, LLC

(57) ABSTRACT

A system and method for providing an overview of a plurality of tasks running on a target environment which includes the steps of receiving event data representing a plurality of events in the plurality of contexts over a monitoring period displaying a detailed graphical representation of the event data log using the event data, and displaying a schematic representation of the detailed graphical representation over the monitoring period using only a portion of the event data. The schematic representation is indicative of an activity density of the event data over the monitoring period.

4 Claims, 4 Drawing Sheets

PROVIDING AN OVERVIEW OF A LARGE EVENT SAMPLE PERIOD THAT SUPPORTS TRIAGE AND NAVIGATION

BACKGROUND

There are many applications where software needs to exert real-time control. Examples of this are control systems for aircraft, factories, automobiles, printers, broker transaction computers, etc. A typical implementation would have a dedicated target computer which controls the aircraft, factory, etc., with target software on the target computer. This computer could be uplinked via a TCP-IP ethernet link, serial linked, networked or otherwise connected to a host computer. This host could be a Unix®-based workstation or a Windows®-based PC, for example. The host can be used to download and configure the software which will run on the target computer, and customize such software.

U.S. Pat. No. 5,872,909 entitled "Logic Analyzer for Software," ("the '909 patent"), describes a system which logs events that occur in target software and displays context status information in a time-line fashion with specific icons indicating events and status changes to show task interaction over time. The system is useful for monitoring performance of software, in particular real-time, embedded or multi-tasking software running on a target computer. The WindView® software analyzer product manufactured and distributed by Wind River Systems, Inc. is a commercially available product that has made use of this system through the use of a host system monitoring a separate target system.

The system of the '909 patent logs events which occur in the target software, and stores these in a buffer for periodic uploading to the host system. Such events include context switching times of particular software tasks, and task status at such context switch times, along with events triggering such a context switch or other events. The host system reconstructs the real-time status of the target software from the limited event data uploaded to it. The status information is then displayed in a user-friendly manner. This provides the ability to perform a logic analyzer function on software in real time (or as a post-mortem). A display having multiple rows, with one for each task or interrupt level, is provided. Along a time line or an axis representing a sequence of events, an indicator shows the status of each task/interrupt with icons indicating events and any change in status. The task status may be indicated with different line patterns or stipples, for example, a wavy line indicating that a program is ready to run, a dotted line indicating that a program is waiting for a semaphore or a message from a message queue that it needs to run, and a dashed line indicating the program is waiting for a time-out. This detailed graphical interface provides an easily understood overall representation of the status of a target software.

When performing triage (e.g., trouble-shooting) on the target software, or when navigating through the collection of event data, it is desirable to have a way of locating an area of interest within the data. Typically, this can be accomplished by zooming out to the maximum level to obtain a resulting "blurred" overview of the entire log. The user can then to search for a dense area of activity and "zoom in" on that area for a more detailed analysis.

However, the maximum level zoom view of the log contains much more information than is required and can be slow to render. The maximum level zoom view also may not adequately display the information when all contexts do not fit on the screen vertically.

Once a specific section of the log has been located, the user can zoom in on that view. A standard window scroll bar may be used to represent the position and relative portion of the log being displayed.

SUMMARY OF THE INVENTION

In accordance with a first embodiment of the present invention, a method is provided for providing an overview of a plurality of contexts in a target environment. The method comprises the steps of receiving event data representing a plurality of events in the plurality of contexts over a monitoring period, constructing a first graphical representation of the event data over the monitoring period using the event data, constructing a second graphical representation over a specified portion of the monitoring period using the event data for that portion of the monitoring period, and simultaneously displaying the first representation and the second representation on a graphical user interface, the first representation displayed in a first scale, the second representation displayed in a second scale, the second scale larger than the first scale.

In accordance with a second embodiment of the present invention, a method is provided for providing an overview of a plurality of contexts in a target environment. The method comprises the steps of receiving event data representing a plurality of events in the plurality of contexts over a monitoring period, displaying a schematic representation of the event data log over the monitoring period using only a portion of the event data, displaying, together with the schematic representation, a detailed graphical representation over a specified portion of the monitoring period using the event data for that portion of the monitoring period. The schematic representation is indicative of an activity density of the event data over the monitoring period.

In accordance with a third embodiment of the present invention, a system is provided which includes an executable logging component and an executable graphing component. The executable logging component is configured to log event data representing a plurality of events in a plurality of contexts running on the target computing environment over a monitoring period. The executable graphing component is configured to display a schematic representation of the event data over the monitoring period using only a portion of the event data, and to display, together with the schematic representation, a detailed graphical representation of the event data log over a specified portion of the monitoring period using the event data for the specified portion of monitoring period.

In accordance with a fourth embodiment of the present invention, a system is provided which includes an executable logging component and an executable graphing component. The executable logging component is configured to log event data representing a plurality of events in a plurality of contexts running on a target computing environment over a monitoring period. The executable graphing component is configured to display a first representation of the event data log over the monitoring period using the event data, and to display, together with the first representation, a second representation of the event data over a specified portion of the event data log using the event data for the specified portion of the monitoring period, the first representation displayed in a first scale, the second representation displayed in a second scale, the second scale larger than the first scale.

In accordance with a fifth embodiment of the present invention, a host computing environment for providing an overview of a plurality of contexts in a target environment is provided. The host computing environment includes an executable component configured to receive from the target computing environment, event data over a monitoring period. The executable component is configured to display a schematic representation of the event data over the monitoring period using only a portion of the event data, and to display, together with the schematic representation, a detailed graphical representation of the event data log over a specified portion of the monitoring period using the event data from the specified portion of the monitoring period. The schematic representation indicative of an activity density of the event data. The event data represents a plurality of events in the plurality of contexts In accordance with a sixth embodiment of the present invention, a host computing environment for providing an overview of a plurality of contexts in a target environment provided. The host computing environment includes an executable component configured to receive from the target computing environment event data over a monitoring period. The executable component is configured to display a first representation of the event data log over the monitoring period using the event data, and to display, together with the first representation, a second representation over a specified portion of the event data using the event data for the specified portion of the monitoring period, the first representation displayed in a first scale, the second representation displayed in a second scale, the second scale larger than the first scale.

In accordance with a seventh embodiment of the present invention, a computer readable media is provided, which has stored thereon, computer executable process steps operable to control a computer to display a schematic representation of event data over a monitoring period on a display using only a portion of the event data, and to display, together with the schematic representation, a detailed graphical representation of the event data over a specified portion of the monitoring period using the event data for the specified portion of the monitoring period. The event data represents a plurality of events associated with a plurality of contexts. The schematic representation is indicative of an activity density of the event data over the monitoring period.

In accordance with further embodiments of the present invention, a computer readable medium is provided which has stored thereon computer executable process steps operative to control a computer in the manner described above with regard to the first, second, third, fourth, fifth, and sixth embodiments.

DETAILED DESCRIPTION OF THE PREFERRED EMBODIMENTS

In accordance with one embodiment of the present invention, a visualization and analysis technique is used in graphing and displaying computer system data that allows a detailed graphical representation of operating system object interaction to be provided. A log of system activity on a target system (e.g. an event data log) is kept for a certain duration and processed to construct a representation of object interaction over the duration of the log. The event data is then presented as a graph of interactions—a detailed graphical representation of the event data log. It is desirable to have a schematic overview of the detailed graphical representation in order to locate an area of interest in the log before performing an analysis. For example, an area of peak activity within the data may be the area to focus on for the analysis. Viewing the detailed graphical representation of the entire event data collection, such as by using a zoom command to zoom out to the maximum level is often a less than optimal way of locating the area of interest. This is because the detailed representation carries much more information than is required for the locating function and the representation can be slow to render. In addition, in certain situations, the entire detailed graph may not fit on the screen vertically.

By providing a schematic representation of the event data, in addition to the detailed graphical representation, location of an area of interest in the data is facilitated. In addition, by coupling information in the schematic representation with information in the detailed graphical representation, navigation within the data is also facilitated.

Once the area of interest is located by examining the schematic representation of the event data, a user can select that area of interest by selecting (e.g., by highlighting or by placing a pair of delineaters) the corresponding portion of the schematic representation, and then view only that portion of the data in the detailed graphical representation view. In certain embodiments of the present invention, the system in accordance with the present invention utilizes the event data logs compatible with commercially available development tools such as the WindView 1.0 or WindView 2.0 development tool manufactured by Wind River Systems, Inc. or the Linux Trace Toolkit currently available through Opersys, Inc. and Lineo, Inc. (www.opersys.com/LTT).

Figure 1:
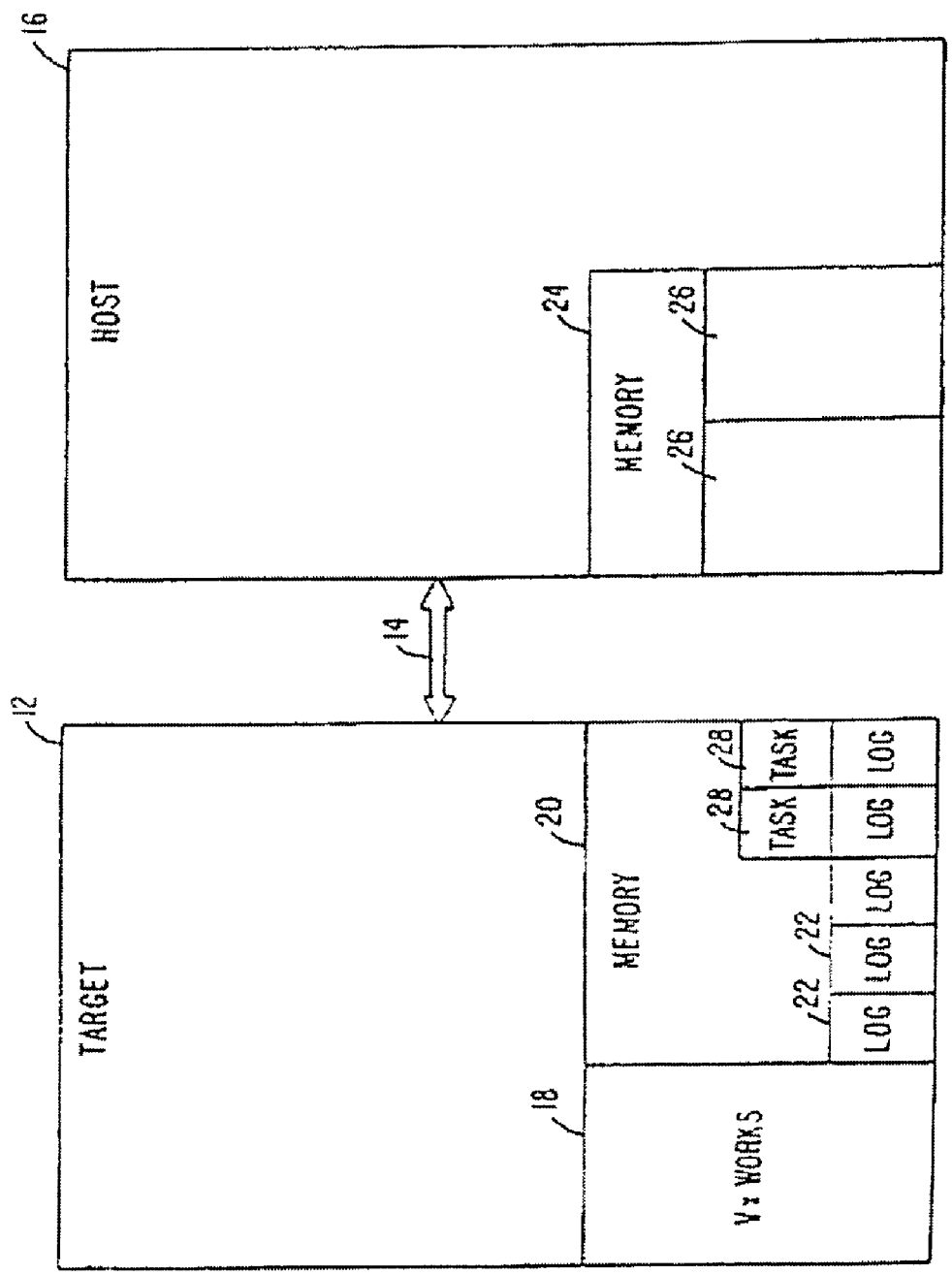
FIG. 1 illustrates a target environment connected via a link to a host computer.

FIG. 1 illustrates a target computing environment 12 (e.g., a target device) connected via a link 14 to a host computing environment 16 (e.g., a host computer). The target 12 includes an operating system 18, such as the VxWorks® operating system of Wind River Systems, Inc. A memory system 20 includes a buffer for storing one or more logs of event data 22, which may be periodically uploaded to host 16 via link 14. Host 16 includes a memory system 24 with reconstructed data fields 26. Data fields 26 are reconstructed from the event data logs 22 to provide the status of different executable entities (e.g., tasks, ISRs, processes, threads)—referred to herein as "executable contexts" or simply as "contexts"—over a monitoring period. The different contexts exist at the target environment in memory 20, indicated as tasks 28 in FIG. 1, and are run as needed or scheduled.

Target environment 12 could be implemented as part of a separate traditional stand-alone computer, or as part of an embedded computer board that is plugged into a car, printer, etc. In each case, link 14 is preferably an ethernet link, using TCP-IP protocol. Alternately, link 14 can be a connection over an in-circuit or ROM emulator, a serial line or any other known method of point-to-point communication. Host environment 16 may, for example, be implemented as part of a workstation running a Unix® or Unix® based operating system, or a PC running a Windows® or Linux operating system.

In addition to the target-and-host structure set forth above, aspects of the present invention are useful where a single computer includes both the target and host environments. For example, the present invention can be applicable to a host computing environment having a multi-tasking architecture (in which case the target and host are the same system) and to a host computing environment executing a simulated target environment (in which the target system resides at the host computer in order to simulate operation of a stand-alone target). The lack of intrusiveness and the ability to provide the status and object interaction display are very useful in these circumstances as well.

As the target environment 12 operates, event information is stored in the log buffer each time an event occurs. In the system of FIG. 1, the log is maintained on the target 12, and is uploaded to the host 16 after the monitoring period. However, it is also possible for the log to be uploaded periodically during the monitoring period (for example, prior to buffer overrun). Moreover, it is also possible to continuously upload the actions taken by each object to the host 16, and to maintain the log of event data over the monitoring period only on the host. In any event, the information in the log may then be processed to create detailed graphical representation of the event data log. It should be noted that the log may contain information on all types of event data and when processed, a sub-set of event data (for example, events related to certain contexts) may be selected for the detailed graphical representation.

Normally, many events are logged with a time stamp which allows them to be correlated with the point in the display corresponding to those time stamps. However, when time stamps are not available, as when no timer hardware is provided or the hardware is not enabled, then those events are logged with an event sequence number. In a preferred embodiment, a sequential event driver tags events with sequence numbers which represent the order in which the events occurred on the target. The events may then be spaced equidistantly from each other in the event display.

Figure 2:
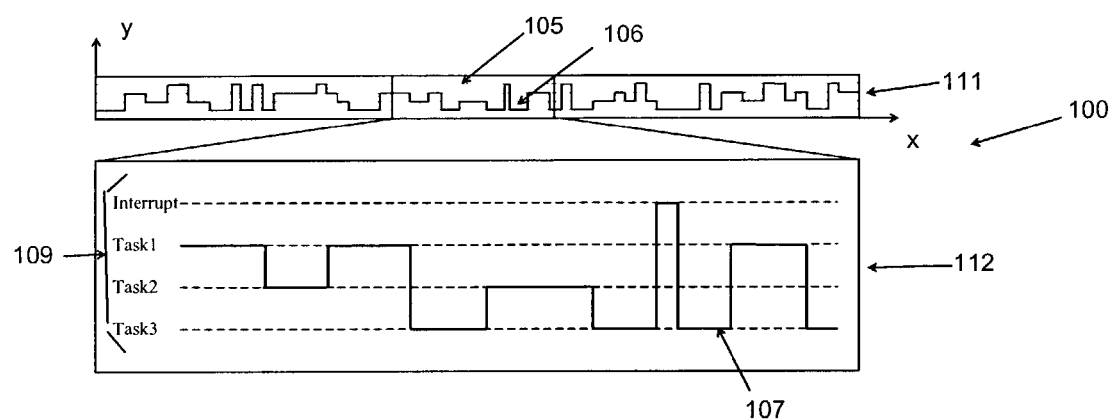
FIG. 2 shows a schematic representation of an event data log depicting an outline of running tasks together with a detailed graphical representation of a portion of the data log according to an embodiment of the present invention.

FIG. 2 shows an illustrative overview 100 of the status of a plurality of contexts in a target environment over a monitoring period. Event data representing a plurality of events is logged over the monitoring period, for example on the target environment, so as to create an event data log. The event data log may be uploaded to a host computing environment for further processing. A schematic representation of the event data log over the monitoring period is constructed and displayed using only a portion of the event data. A detailed graphical representation of the event data log over a specific portion of the monitoring period is then constructed and displayed using the event data for that specific portion of the monitoring period. As noted above, the detailed graphical representation may use a subset of the total event data for the specific portion of the monitoring period. It should also be noted that although the schematic representation preferably uses only a portion of the event data, it may, in some embodiments use all of the event data. In such an embodiment, the difference between the two displays would be only that the schematic presentation shows the entire monitoring period in a first scale, whereas the detailed representation shows a portion of the monitoring period in a second, larger scale.

FIG. 2 shows a schematic representation 111 of the detailed graphical representation over the entire monitoring period. Graph portion 106 of schematic representation 111 indicates an activity of the event data log, and in this embodiment, specifically represents an outline of executing contexts in the event data log over time. The x-axis in this embodiment represents units of time and the y-axis corresponds to specific executable contexts at the target environment. The graph portion of schematic representation 111 illustrates the detailed graphic representation (and thereby the event data log) in a more abstract and less detailed form than a display of the detailed graphical representation of the event data log.

Selected portion 105 is delineated by a pair of delimeters (in this case, vertical bars) and represents that portion of the monitoring period of the schematic representation 111 that a user has selected as being an area of interest. The box labeled with reference numeral 112 is the display of a portion of the graphical representation corresponding to the highlighted portion of the monitoring period 105. In this illustration the portion of the monitoring period is less than the entire monitoring period. However, the user could choose to select the entire monitoring period. In that case the detailed graphical representation for the entire monitoring period would be displayed in box 112. Graph portion 107 represents a more detailed representation of the executing contexts in the event data log, that corresponds to graph portion 106 within the selected portion 105 of the schematic representation 111. The specific contexts 109 may be listed within the detailed graphical representation so that the user can easily see the status of all contexts during the selected portion of the monitoring period. The user can select whatever portion of the schematic representation that he is interested in viewing as a detailed graphical representation, and can therefore efficiently navigate through the log, without requiring the entire detailed graphical representation to be rendered. One or more standard window "scroll bars" may also be included in the detailed graphical representation to represent the relative position and relative portion of the event log being displayed in the detailed graphical representation, and may also be used to navigate to an earlier or later portion of the monitoring period. For example, the vertical bars of FIG. 2 could be implemented as scroll bars.

Figure 3:
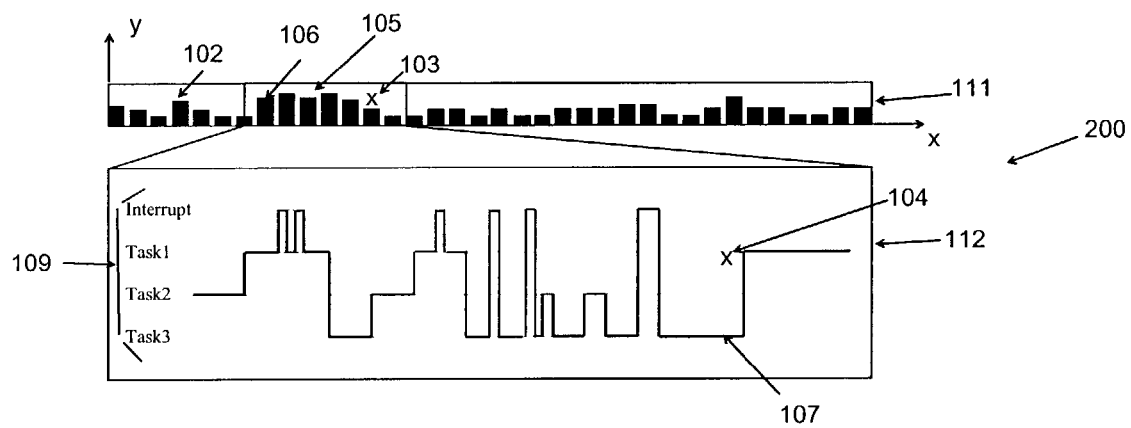
FIG. 3 shows a schematic representation of an event data log in the form of a bar chart of events on a time line together with a detailed graphical representation of a highlighted portion of the data log according to another embodiment of the present invention.

FIG. 3 shows another embodiment of an overview 200 of the status of a plurality of contexts in a target environment. In this embodiment, graph portion 106 is in the form of a bar graph having a plurality of bars 102. Each bar in this schematic represents a quantity of event activity per unit of time. The x-axis here represents units of time, and the y-axis represents quantity of activity. Similar to FIG. 2, selected portion 105 represents that portion of the monitoring period that a user has selected to be an area of interest. Detailed graphical representation 112 gives a more detailed overview of the event data log for the selected portion of the monitoring period. Graph portion 107 of detailed graphical portion 112 shows more specific information regarding the event data log, in this case an overview of which contexts are executing at each time increment.

Marker 103 may be inserted into the schematic representation 111 by a user to be associated with an item in the schematic representation 111 (such as by issuing an appropriate marking command). An indication 104 of marker 103 is displayed in the detailed graphical representation as being associated with a corresponding item in the detailed graphical representation. Likewise, markers defined in the detailed graphical representation would also appear in the schematic representation as being associated with a corresponding item in the schematic representation. These markers may include labels for notation, and can assist in navigating around the log and as points between which timing measurements can be made.

Figure 4:
FIG. 4 shows another view of a schematic representation of an event log in the form of a bar chart of events on a time line.

FIG. 4 is another view of a display of the schematic representation 111 of the type shown in FIG. 3. Again, graph portion 106 is in the form of a bar chart having a plurality of bars 102. The x-axis represents units of time and the y-axis represents quantity of event activity. Selected portion 105 is delineated by highlighting and includes a portion of the monitoring period that is indicated by the schematic representation as the beginning of a period of high activity within the monitoring period.

Figure 5:
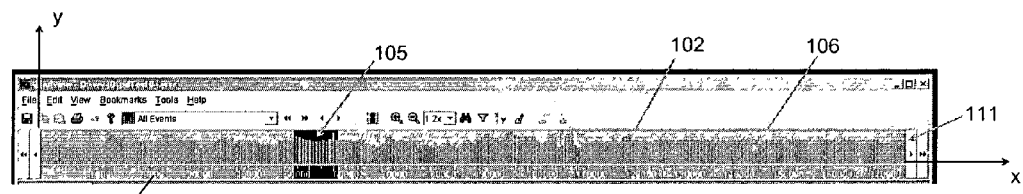
FIG. 5 shows a view of a schematic representation of a sequential event data log in the form of a bar chart of events wherein the x-axis represents a sequence of events in the data log.

FIG. 5 is another view of a display of a schematic representation 111. Again, graph part 106 is in the form of a bar chart having a plurality of bars 102, each representing a quantity of activity. However, in this example, there is no timer hardware in the target environment and no timing information is available. In this example, the event data is logged with an event sequence number 200 instead of with a time stamp. In the schematic representation in FIG. 5, the time between every event is assumed to be equal. In this case a bar chart of event activity will not provide good information to the user about when in the log the event activity is most intense. Another limitation of the bar graph embodiment of the schematic representation is that it indicates the quantity of events in a given time period, or sequence period, without giving specific information about the context (e.g. row) in which the activity occurs.

Figure 6:
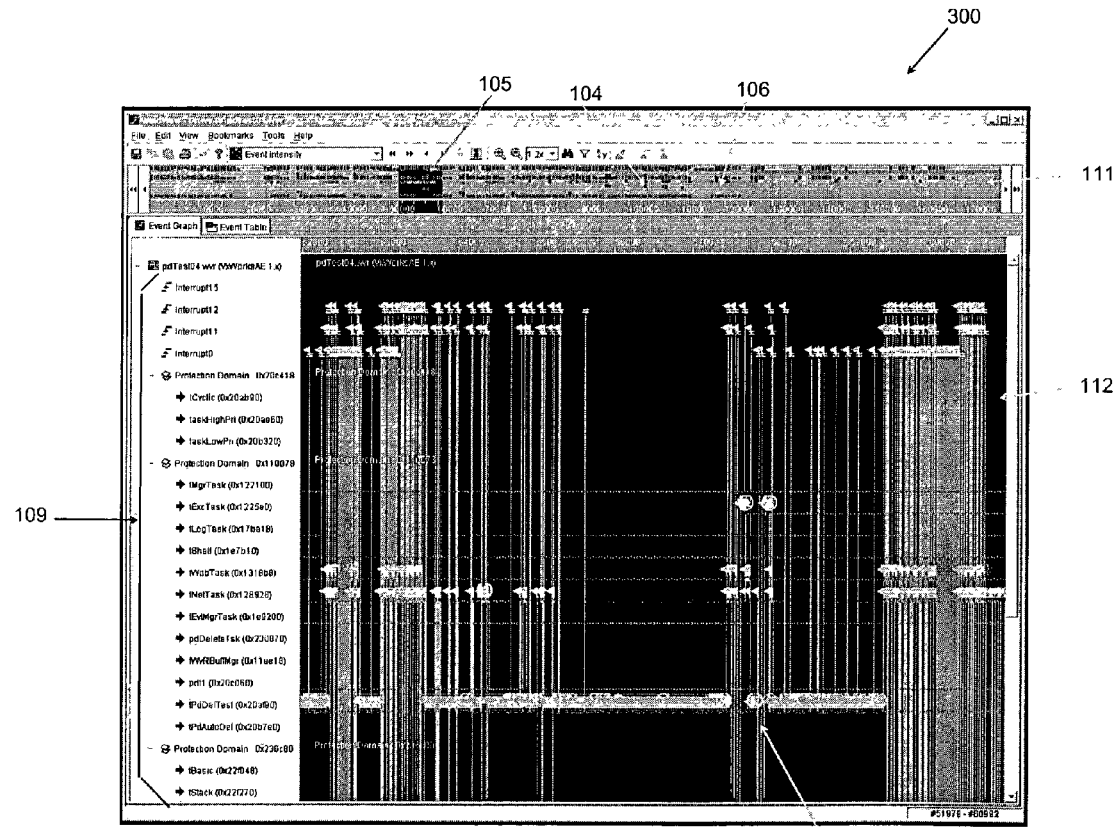
FIG. 6 shows a combination view of a different schematic representation of the event data log shown in FIG. 5 together with a detailed graphical representation of a highlighted portion of the schematic representation.

FIG. 6 shows another embodiment of an overview 300 of the status of a plurality of contexts in a target environment. In this embodiment, schematic representation 111 includes graph portion 106 which represents an event intensity graph, (or heat map). Unlike the bar chart of FIG. 5, this schematic representation gives information, not only about the quantity of event activity in a particular portion of the log, but also an indication of the contexts (or rows) in which that activity is taking place. Graph portion 106 includes graphical elements 104 (shown here as dots, or blocks) that indicate an activity at a particular context (or row) that is occurring at a particular time unit or sequence number. The graphical element may have a color (or shade of gray), and the intensity or shade of the color is indicative of the quantity of events occurring at each context within each time period or sequence step. Here the lighter the shade, the greater the number of events. This can be very useful in spotting areas of intense activity within a specific context or in event data logs that do not include timing information. It allows the user to navigate not only with regard to specific periods within the log, but also with respect to specific contexts.

Detailed graphical representation 112 in FIG. 6 shows, in more detail, an overview of the log of events corresponding to the portion of the monitoring period in highlighted portion 105 of the schematic representation 105. In the detailed graphical representation, the contexts 109 are labeled and the individual events can be observed. The vertical positions of the blocks in the schematic representation correspond to the row of their respective contexts in the detailed graphical representation. Thus, in the highlighted region of the schematic representation, there appears to be a small amount of activity toward the top of the rows of contexts, while there appears to be a large amount of activity about halfway down the rows of contexts. When viewing the detailed graphical representation, the user can confirm that this activity is occurring in the context labeled tPdDelTest.

It is also possible to overlay one of several analysis pack factors over the schematic representation in order to provide additional information that may be helpful in analyzing the information in the log. Current versions of the WindView® product (for example) include analysis packs that enable a user to display a graphical representation of one or more analysis pack factors giving information about the log. The representation appears in a frame or window separate from the schematic representation and/or the detailed graphical representation. The analysis pack view can be generated according to user specifications as an extraction and interpretation of the data in the event data log in addition to the context interaction displayed in the detailed graphical representation. Examples of analysis pack factors include memory usage, counting of semaphores, allocation and deallocation of any particular object of interest, interrupts, entry to or exit from particular contexts, time in a context, time that tasks are interrupted, CPU usage, amount of time CPU is idle, amount of time CPU is not idle, total semaphores created or deleted, and time in a protected domain. According to one embodiment of the present invention, some or all of these analysis pack factors can be displayed in the schematic representation as an overlay, in order to provide additional information in the schematic representation that may be helpful to a particular analysis of the event data log.

Figure 7:
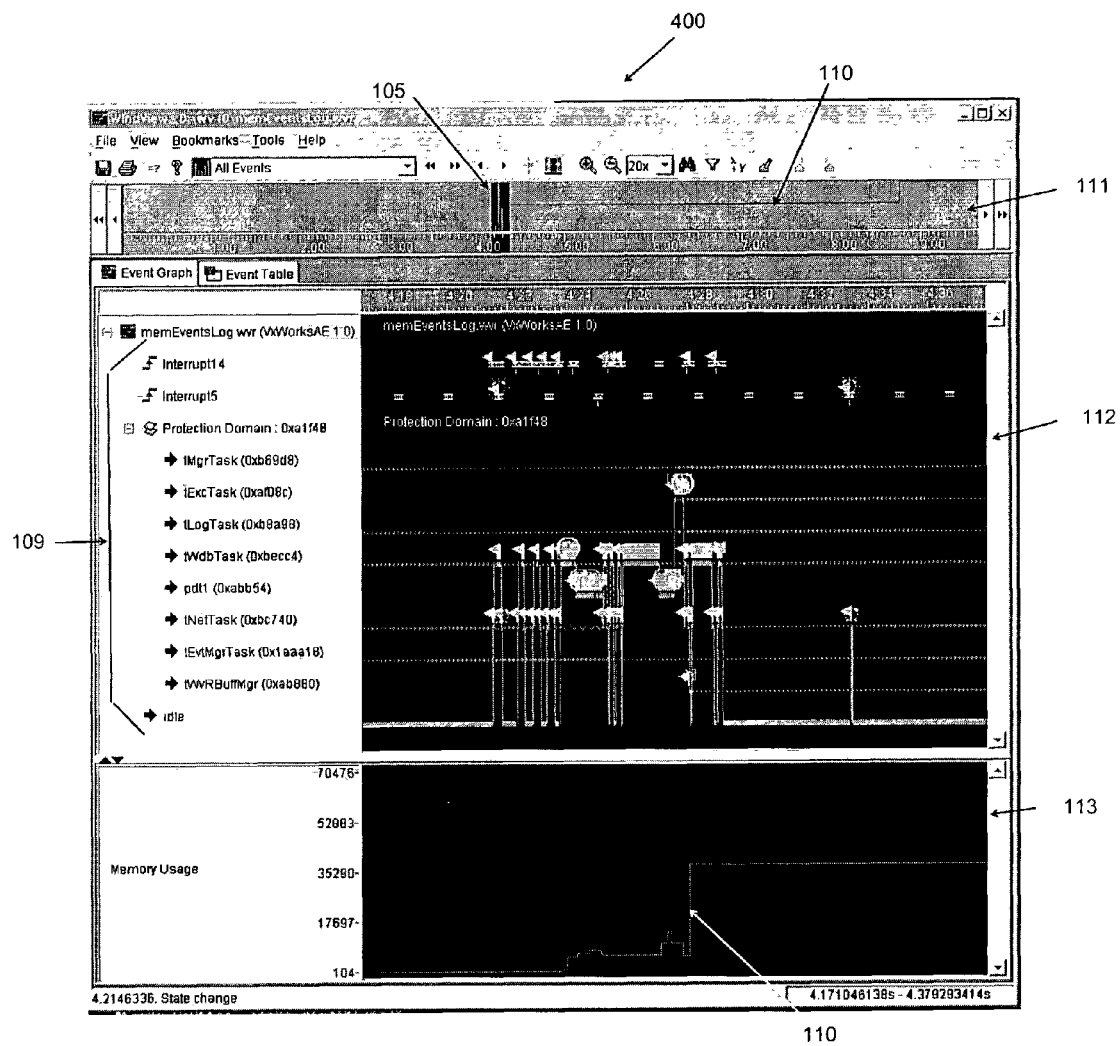
FIG. 7 shows a combination view of another schematic representation of an event data log together with both a detailed graphical representation and an analysis pack view of a highlighted portion of the schematic representation.

FIG. 7 shows another embodiment of an overview 400 of the status of a plurality of contexts in a target environment. Overview 400 includes schematic representation 111 of the event data log, detailed graphical representation 112 of the highlighted portion 105 of the schematic representation 111, and an analysis pack view 113 showing additional information about the highlighted portion 105 of the event data log. In this embodiment, the analysis pack view 113 shows a line graph 110 representing memory usage during the highlighted portion 105 of the event data log. Schematic representation 111 includes the line graph of memory usage 110 both inside and outside the highlighted portion 105 as an overlay over graph 106. Other types of information may also be displayed in the analysis pack view 113 including the examples of analysis pack factors listed above. Those analysis pack factors may also be shown in schematic representation 111 as an overlay in a similar manner as the memory usage line graph 110, in order to provide additional useful analytical information about the event data log in graphical format.

In addition to saving the event data log by itself, for example as a WVA file, the present invention preferably enables the user to save a whole new version of the log which includes some or all of the additionally generated information, such as the schematic representation, analysis, comments made by the user, markers, etc. This information can then be recalled, and the graphs redisplayed.

In the preceding specification, the invention has been described with reference to specific exemplary embodiments thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for providing an overview of a plurality of contexts of a target environment, the method comprising:
   receiving event data representing a plurality of events in the plurality of contexts over a monitoring period;
   displaying a schematic representation of the event data over the monitoring period using only a portion of the event data, the schematic representation being indicative of an activity density of the event data over the monitoring period;

displaying, together with the schematic representation, a detailed graphical representation of the event data over a specified portion of the monitoring period using the event data for the specified portion of the monitoring period;

receiving from a user, a selection generating a marker associated with an item of the schematic representation, wherein the displaying the schematic representation includes displaying said marker in the schematic representation, and wherein the displaying the detailed graphical representation includes displaying an indication of the marker in the detailed graphic representation; and wherein the displaying of the schematic representation includes displaying an event intensity graph including a plurality of graphical elements, each graphical element being indicative of an event intensity of one of the plurality of contexts.

2. The method as recited in claim 1 wherein a color intensity of each of the plurality of graphical elements is indicative of the event intensity.

3. A system encoded on a computer readable medium comprising:

an executable logging component, the executable logging component configured to log event data representing a plurality of events in a plurality of contexts running on a target environment over a monitoring period;

an executable graphing component, the executable graphing component configured to:

display a schematic representation of event data over the monitoring period using only a portion of the event data;

display, together with the schematic representation, a detailed graphical representation of event data over a specified portion of the monitoring period using the event data for the specified portion of the monitoring period;

receive a selection, from a user, generating a marker associated with an item of the schematic representation, to display the marker in the schematic representation, and to display an indication of the marker in the detailed graphical representation; and wherein the schematic representation includes an event intensity graph including a plurality of graphical elements, each graphical element being indicative of an event intensity at one of the plurality of contexts.

4. The system as recited in claim 3 wherein a color intensity of each of the plurality of detailed graphical elements is indicative of the event intensity.

* * * * *